United States Patent
Felch et al.

(10) Patent No.: US 12,459,478 B2
(45) Date of Patent: Nov. 4, 2025

(54) BRAKE ARCHITECTURE FOR A FULL, FOUR CORNER ELECTROMECHANICAL BRAKING SYSTEM

(71) Applicant: Ford Global Technologies, LLC, Dearborn, MI (US)

(72) Inventors: Harold John Felch, Novi, MI (US); Thomas Svensson, Leichlingen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

(21) Appl. No.: 18/489,071

(22) Filed: Oct. 18, 2023

(65) Prior Publication Data

US 2025/0128689 A1    Apr. 24, 2025

(51) Int. Cl.
 *B60T 13/74* (2006.01)
 *B60T 7/04* (2006.01)
 *B60T 17/22* (2006.01)

(52) U.S. Cl.
 CPC ........... *B60T 13/746* (2013.01); *B60T 7/042* (2013.01); *B60T 17/221* (2013.01); *B60T 2220/04* (2013.01); *B60T 2270/402* (2013.01); *B60T 2270/403* (2013.01)

(58) Field of Classification Search
 CPC ............... B60T 13/746; B60T 7/0472; B60T 2270/402; B60T 2270/403
 See application file for complete search history.

(56) References Cited

U.S. PATENT DOCUMENTS

| | | | |
|---|---|---|---|
| 7,826,952 B2 | 11/2010 | Disser et al. | |
| 7,837,278 B2 | 11/2010 | Nilsson | |
| 8,639,428 B2 | 1/2014 | Holzwarth | |
| 10,501,063 B2 | 12/2019 | Krueger et al. | |
| 11,465,636 B2 | 10/2022 | Sutton et al. | |
| 2004/0135432 A1 | 7/2004 | Reuter et al. | |
| 2004/0212250 A1* | 10/2004 | Yokoyama | B60T 8/88 303/122.04 |
| 2005/0017574 A1 | 1/2005 | Weiberle et al. | |
| 2005/0200194 A1* | 9/2005 | Nilsson | B60T 13/74 303/122.04 |
| 2005/0269870 A1* | 12/2005 | Ohashi | H02J 7/0029 303/20 |
| 2010/0243388 A1 | 9/2010 | Holzwarth | |
| 2011/0254357 A1 | 10/2011 | Vollert et al. | |
| 2016/0325738 A1* | 11/2016 | Miyazaki | B60L 58/20 |
| 2019/0299944 A1* | 10/2019 | Nilsson | B60T 7/042 |
| 2020/0324751 A1 | 10/2020 | Englert et al. | |
| 2021/0323523 A1 | 10/2021 | Adler et al. | |

(Continued)

FOREIGN PATENT DOCUMENTS

CN    110154769 A    8/2019
CN    211364532 U    8/2020

(Continued)

*Primary Examiner* — Long T Tran
(74) *Attorney, Agent, or Firm* — Burr & Forman; Lorne Forsythe

(57) ABSTRACT

A vehicle braking system may include a first EMB assembly associated with a first wheel, a second EMB assembly associated with a second wheel, a third EMB assembly associated with a third wheel, a fourth EMB assembly associated with a fourth wheel, a control module to control application of signaling and power for operation of the first, second, third and fourth EMB assemblies where the power is provided from a first power network and a second power network, a first temporary power supply to backup the first power network, and a second temporary power supply to backup the second power network.

17 Claims, 3 Drawing Sheets

(56) References Cited

U.S. PATENT DOCUMENTS

| | | | |
|---|---|---|---|
| 2022/0017053 A1 | 1/2022 | Kiep et al. | |
| 2022/0194344 A1 | 6/2022 | Tarandek et al. | |
| 2022/0242424 A1* | 8/2022 | Saenz | B60W 10/06 |
| 2022/0306063 A1 | 9/2022 | Choi et al. | |
| 2022/0314950 A1 | 10/2022 | Nilsson et al. | |
| 2023/0018321 A1* | 1/2023 | King | B60B 35/004 |
| 2023/0073739 A1* | 3/2023 | Marinov | B60T 13/746 |
| 2023/0125088 A1* | 4/2023 | Beuss | B60T 13/741 |
| | | | 188/106 P |
| 2023/0202437 A1 | 6/2023 | Nilsson et al. | |
| 2023/0294621 A1* | 9/2023 | Geula | B60R 16/033 |

FOREIGN PATENT DOCUMENTS

| | | |
|---|---|---|
| DE | 10319194 B3 | 9/2004 |
| DE | 10319663 A1 | 11/2004 |
| DE | 102004014623 A1 | 10/2005 |
| DE | 102005037382 A1 | 2/2007 |
| DE | 102006055765 A1 | 1/2008 |
| DE | 202019107193 U1 | 1/2021 |
| DE | 102021121914 A1 | 2/2022 |
| EP | 2164735 B1 | 6/2012 |
| EP | 4163166 A1 | 4/2023 |
| JP | 2006035967 A | 2/2006 |
| JP | 4160465 B2 | 10/2008 |
| JP | 2017013669 A | 1/2017 |
| JP | 2022061319 A | 4/2022 |
| KR | 20100094146 A | 8/2010 |
| KR | 101512869 B1 | 4/2015 |
| KR | 102288749 B1 | 8/2021 |
| WO | 0066410 A1 | 11/2000 |
| WO | 2022043153 A1 | 3/2022 |
| WO | 2023008573 A1 | 2/2023 |

* cited by examiner

BRAKE ARCHITECTURE FOR A FULL, FOUR CORNER ELECTROMECHANICAL BRAKING SYSTEM

TECHNICAL FIELD

Example embodiments generally relate to vehicle braking systems and, more particularly, relate to a system that provides full, four corner electromechanical brakes (EMB).

BACKGROUND

Electromechanical brakes (EMB) are becoming popular as an alternative to hydraulic brakes. EMBs do not rely on physical or hydraulic connections between the brake pedal and wheel end braking components. Since the braking connections are electrical in nature, backup power and signaling must be provided. Thus, it may be desirable to develop an architecture that provides redundant power supply and signaling capabilities with respect to a four corner, full EMB brake system.

BRIEF SUMMARY OF SOME EXAMPLES

In accordance with an example embodiment, a vehicle braking system may be provided. The vehicle braking system may include a first EMB assembly associated with a first wheel, a second EMB assembly associated with a second wheel, a third EMB assembly associated with a third wheel, a fourth EMB assembly associated with a fourth wheel, a control module to control application of signaling and power for operation of the first, second, third and fourth EMB assemblies where the power is provided from a first power network and a second power network, a first temporary power supply to backup the first power network, and a second temporary power supply to backup the second power network.

In another example embodiment, a method of providing backup braking power to a four corner, full EMB braking system via a control module may be provided. The method may include monitoring a first power network supplying power to a first set of ECUs and corresponding EMBs, monitoring a second power network supplying power to a second set of ECUs and corresponding EMBs, providing power to the first set of ECUs and corresponding EMBs from a first temporary power supply responsive to detecting a loss of the first power network, and providing power to the second set of ECUs and corresponding EMBs from a second temporary power supply responsive to detecting a loss of the second power network.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
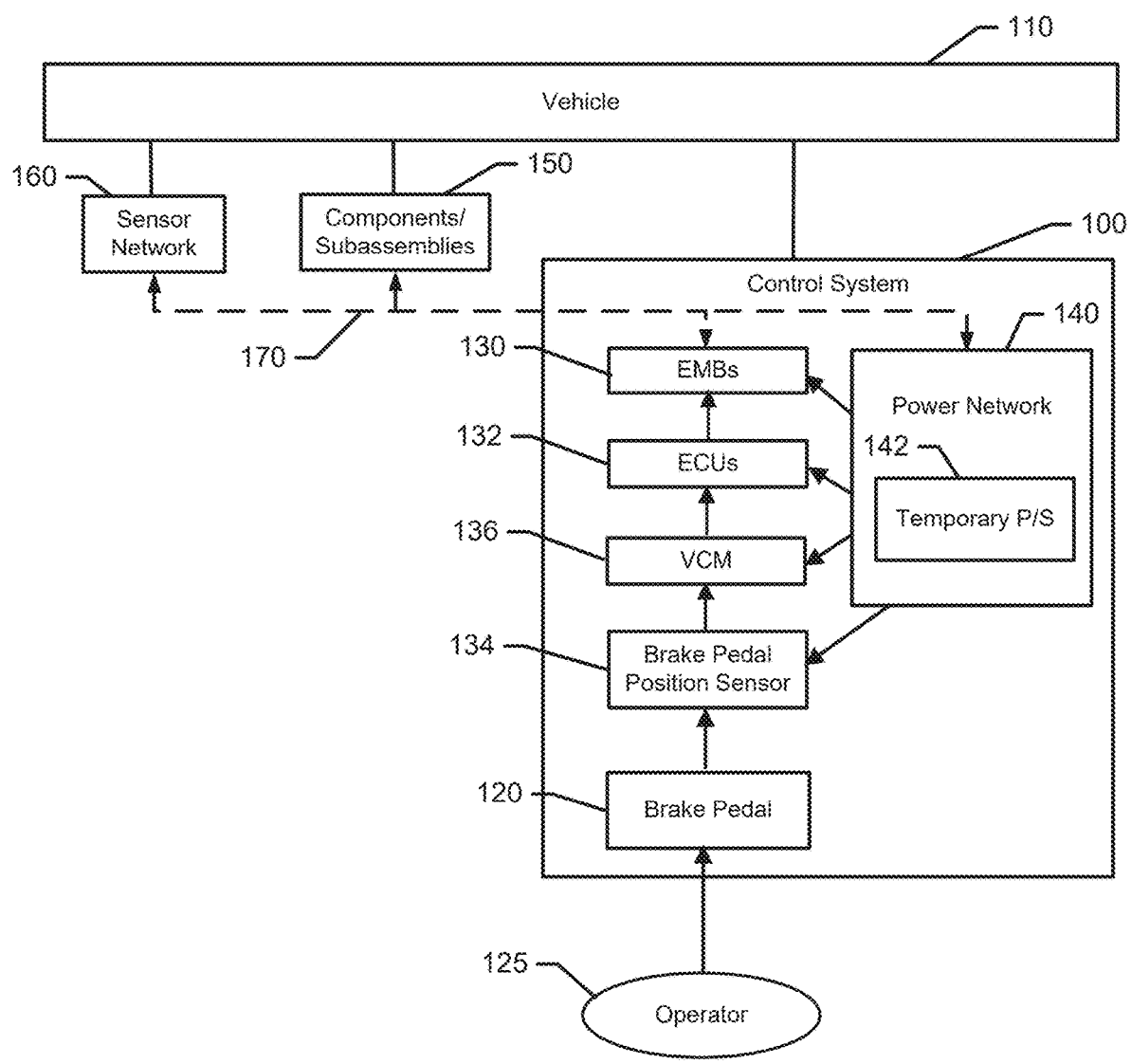
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Normally, redundancy is required for powering of electromechanical brake (EMB) architectures in passenger vehicles. To provide such redundancy, for an unlimited time would likely be a very onerous requirement, and would likely eliminate the possibility of doing so with a full, four corner EMB braking architecture. However, it may be possible to provide redundant power, even for the possibility of a single or dual power loss, for a limited time. To the extent the limited time is sufficient to enable the vehicle to be brought to a stable state in the event of a single or dual loss of power, it may become feasible to employ a full, four corner EMB braking architecture. Example embodiments aim to provide such capability.

In this regard, example embodiments may provide a full, four corner EMB system that further provides backup power that, although temporary, is sufficient to enable the vehicle to be slowed to a stop even in the event of a single or dual power loss. Network communication and power bus structures are therefore provided to enable signaling and power for a dual power loss. FIG. 1 illustrates a block diagram of a vehicle control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may include one or more input devices in the form of one or more control pedals. In some embodiments, the control pedals may include a brake pedal 120 that is generally foot operated by an operator 125 to initiate braking forces, or braking torque application at the wheels of the vehicle 110. The brake pedal 120 may be operably coupled to EMBs 130 associated with all four wheels, respectively. The EMBs 130 may operate under the local control of electronic control units (ECUs) 132. The brake pedal 120 may also be operably coupled to EMBs 130 via a brake pedal position sensor 134, and the EMBs 130 may be actuated responsive to operation of respective instances of ECUs 132 that receive instruction from a vehicle control module (VCM) 136 operably coupled to the brake pedal position sensor 134 to receive position information indicative of the brake pedal 120. The brake pedal position sensor 134 may provide data indicative of the precise position of the brake pedal 120 as an input to the VCM 136.

The EMBs 130, the ECUs 132, the brake pedal position sensor 134 and/or the VCM 136 may receive power from a power network 140. The power network 140 may include redundant power supplies. However, the power network 140 may further include a temporary power supply 142, which provides backup power even in the event of a dual power loss involving the otherwise redundant power supplies of the power network 140. Details of the power network 140 and the temporary power supply 142 will be described in reference to FIG. 2 below.

Notably, the control pedals could alternatively be hand operated or any other operable member via which the operator 125 may provide an input indicative of an intent of the operator relative to controlling net torque for application to the wheels of the vehicle 110. In some cases, the control system 100 may be configured to perform other tasks related or not related to propulsive and braking control or performance management.

In an example embodiment, the control system 100 may receive information that is used to determine vehicle status from various components or subassemblies 150 of the vehicle 110. Additionally or alternatively, various sensors that may be operably coupled to the components or subassemblies 150 may be included, and may provide input to the control system 100 that is used in determining vehicle status. Such sensors may be part of a sensor network 160 and sensors of the sensor network 160 may be operably coupled to the control system 100 (and/or the components or subassemblies 150) via one or more instances of a vehicle communication bus 170 (e.g., a controller area network (CAN) bus, of Ethernet).

The components or subassemblies 150 may include, for example, a braking system, a propulsion system and/or a wheel assembly of the vehicle 110. The braking system may be configured to provide braking inputs to braking components of the vehicle 110, and includes the components discussed above. One or more corresponding sensors of the sensor network 160 that may be operably coupled to the brake system and/or the wheel assembly may provide information relating to brake torque, brake torque rate, vehicle velocity (including rate of change of velocity), front/rear wheel speeds, vehicle pitch, etc. Inputs from the sensors of the sensor network 160 may be provided to the control system 100 to enable the control system 100 to provide various primary and secondary (or backup) control functions related to the components or subassemblies 150. Accordingly, for example, the control system 100 may be able to receive numerous different parameters, indications and other information that may be related to or indicative of different situations or conditions associated with vehicle status. The control system 100 may also receive information indicative of the intent of the operator 125 relative to control of various aspects of operation of the vehicle 110 and then be configured to use the information received to provide instructions to control responses to the situations or conditions determined. The control system 100 of FIG. 1 may be similar to conventional systems in many respects, except that, the control system 100 may be modified to include four corner EMBs 130, and the temporary power supply 142 in the power network 140 to ensure a capability to respond to situations in which backup power and signaling is required for the EMBs 130 in the event of a dual power loss as described in greater detail in reference to FIG. 2.

Figure 2:
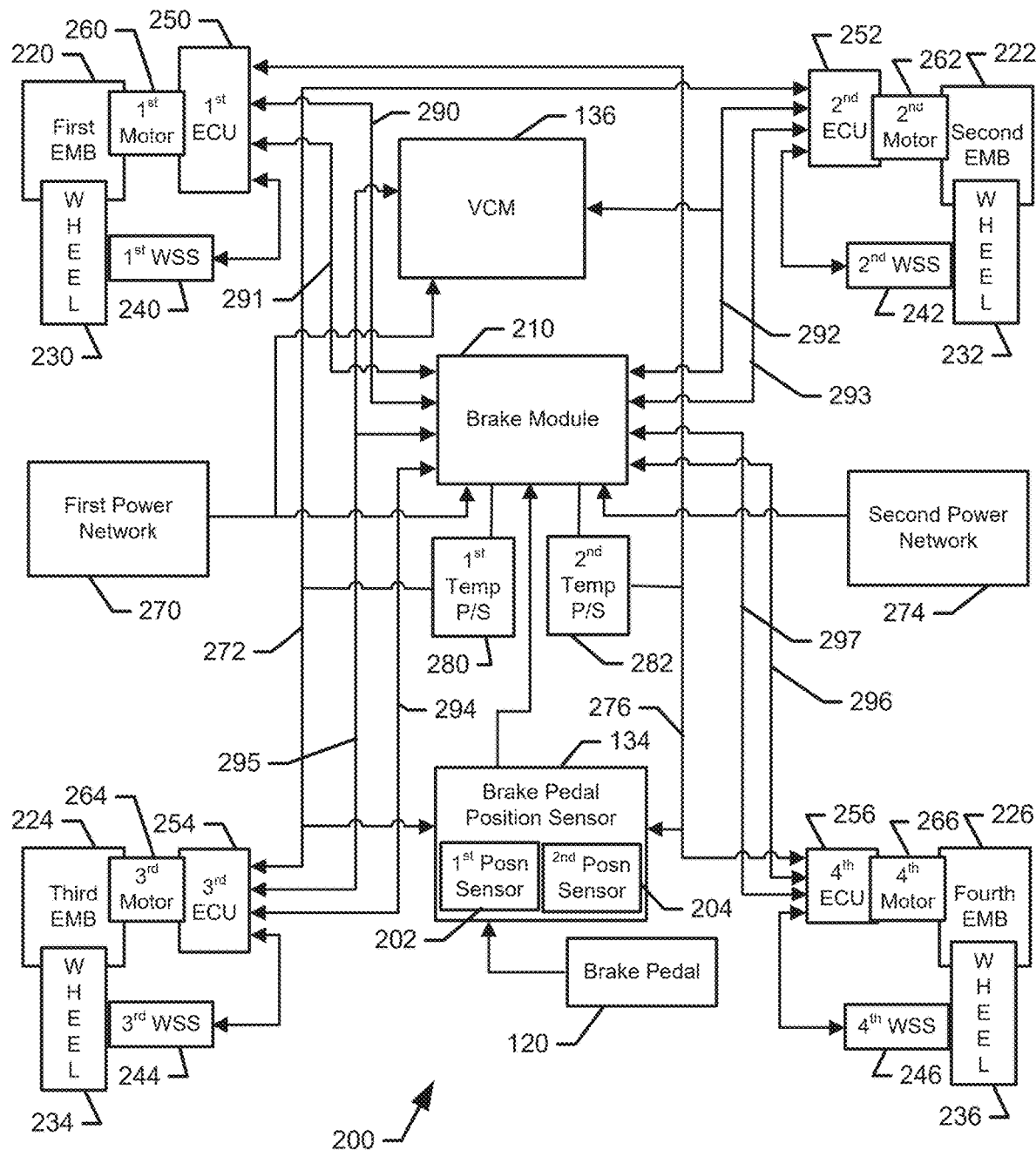
FIG. 2 illustrates a block diagram of some components of the vehicle control system of FIG. 1 in accordance with an example embodiment.

FIG. 2 illustrates a block diagram of various components of a control system 200, which may be considered either a specific example of the control system 100 of FIG. 1, or a portion thereof that is associated with a vehicle braking system. In this regard, for example, FIG. 2 illustrates example interactions for the control system 200 between the brake pedal 120, the EMBs 130, the ECUs 132, the brake pedal position sensor 134 and/or the VCM 136 of FIG. 1, and various other elements of the components or subassemblies 150 relative to information received thereby (e.g., from the sensor network 160, from various ones of the components/subassemblies 150, and/or from the operator 125). In particular, FIG. 2 illustrates details associated with formation of the power network 140 and various communication buses that may be employed to provide primary and backup power and signaling in the event of a dual power loss.

The control system 200 may include the brake pedal 120, which may have the corresponding brake pedal position sensor 134 for determining a position of the brake pedal 120 and providing a signal or input to the VCM 136 that is indicative of the position determined. In an example embodiment, the brake pedal position sensor 134 may be embodied as a dual sensor, including two separate instances of position sensors (e.g., first position sensor 202 and second position sensor 204) such that redundant sensing capabilities are provided by the brake pedal position sensor 134. However, in addition to redundancy by virtue of duplicating the sensors, the first and second position sensors 202 and 204 may further provide effective backup by employing different sensing technologies. For example, the first and second position sensors 202 and 204 may employ any different sensors among options including magnetic read switches, Hall Effect sensors, or other mechanical, magnetic or electric sensing means for determining a percentage of deflection or movement of the brake pedal 120, which are communicated as a position in electronic form.

The determined pedal position of the brake pedal 120 may be communicated from the brake pedal position sensor 134 to a brake module 210, which may include processing circuitry (e.g., a processor and memory) for executing control algorithms or instructions associated with issuing commands to the EMBs 130. In embodiments in which the brake pedal position sensor 134 is a dual sensor, each of the first and second position sensors 202 and 204 may include separate signaling paths to the brake module 210 to ensure redundant signaling capabilities that are independent of each other.

The EMBs 120 of FIG. 1 may be embodied as a first EMB 220, a second EMB 222, a third EMB 224 and a fourth EMB 226 disposed at each of the four corners of the vehicle 110. Thus, for example, the first EMB 220 may be associated with a first wheel 230 (e.g., a left front wheel) of the vehicle 110. The second EMB 222 may be associated with a second wheel 232 (e.g., a right front wheel) of the vehicle 110. The third EMB 224 may be associated with a third wheel 234 (e.g., a left rear wheel) of the vehicle 110. The fourth EMB 226 may be associated with a fourth wheel 236 (e.g., a right rear wheel) of the vehicle 110.

Each of the wheels (e.g., the first, second, third and fourth wheels 230, 232, 234 and 236) may have a corresponding wheel speed sensor associated therewith (e.g., first wheel speed sensor (WSS) 240 for the first wheel 230, a second WSS 242 for the second wheel 232, a third WSS 244 for the third wheel 234, and a fourth WSS 246 for the fourth wheel 236) to measure the wheel speed of the corresponding ones of the wheels and provide information on wheel speed measured to the respective instances of ECUs 132. The ECUs 132 may include a first ECU 250 associated with the first EMB 220, a second ECU 252 associated with the second EMB 222, a third ECU 254 associated with the third EMB 224, and a fourth ECU 256 associated with the fourth EMB 226. The first ECU 250 may be operably coupled to a first motor 260, which may actuate a brake caliper or drum (based on brake pedal 120 application) under control of the first ECU 250 to provide braking torque to the first wheel 230 (e.g., the left front wheel). The second ECU 252 may be operably coupled to a second motor 262, which may actuate a brake caliper or drum (based on brake pedal 120 application) under control of the second ECU 252 to provide braking torque to the second wheel 232 (e.g., the right front wheel). The third ECU 254 may be operably coupled to a third motor 264, which may actuate a brake caliper or drum (based on brake pedal 120 application) under control of the third ECU 254 to provide braking torque to the third wheel 234 (e.g., the left rear wheel). The fourth ECU 256 may be operably coupled to a fourth motor 266, which may actuate a brake caliper or drum (based on brake pedal 120 application) under control of the fourth ECU 256 to provide braking torque to the fourth wheel 236 (e.g., the right rear wheel).

The first, second, third and fourth ECUs 250, 252, 254 and 256 may take electronic instruction from the VCM 136 for initiating braking functions via the first, second, third and fourth EMBs 220, 222, 224 and 226, respectively, and there is no mechanical/hydraulic connection therefore between the brake pedal 120 and the corresponding front and rear brakes in this example. Given that these instructions are transmitted electronically, redundant power supplies are employed to ensure that braking can be accomplished even if one of the power supplies happens to be lost for any reason. Accordingly, a first power network 270 is provided to power the second EMB 222, the second ECU 252 and the second motor 262 along with the third EMB 224, third ECU 254 and third motor 264 via the brake module 210 and corresponding power network bus (e.g., first power network bus 272). A second power network 274 is provided to power the first EMB 220, first ECU 250 and first motor 260 along with the fourth EMB 226, fourth ECU 256 and fourth motor 266 via the brake module 210 and corresponding power network bus (e.g., second power network bus 276). In this example, the first power network 280 also powers the VCM 136. Thus, all electronic components needed for braking are powered from different power supplies and corresponding networks to ensure that power is available for braking. Moreover, primary power for opposite corners is shared such that if a single one of the first or second power networks 270 and 274 is lost, primary braking power remains for opposite corners. For example, if primary power for the first and fourth EMBs 220 and 226 is lost (due to loss of the second power network 274), primary power remains for the second and third EMBs 222 and 224 (due to the unaffected nature of the second power network 274).

Nevertheless, the braking module 210 also includes or is otherwise operably coupled to a first temporary power supply 280 and a second temporary power supply 282. The first and second temporary power supplies 280 and 282 may be super capacitors or ultra-capacitors that ensure adequate backup power in the event of a single or dual power loss (i.e., loss of one or both of the first and second power networks 270 and 274) to slow the vehicle 110 to a stop. Because the ultra-capacitors are relatively small in size, there is little overhead associated with adding them to the system 200 from either a spatial or monetary perspective. Meanwhile, the first and second temporary power supplies 280 and 282 are effective in providing backup power for stopping even if one or more ECUs or primary power supplies is lost. In an example embodiment, the first power network 270 may be a quality management (QM) power source, and the second power network 274 may be an ASIL B power source. However, other power sources may be employed in alternative embodiments.

The first ECU 250 may be operably coupled to the brake module 210 by a first communication bus 290 and a second communication bus 291. One of the first and second communication buses 290 and 291 may be a public CAN, and the other of the first and second communication buses 290 and 291 may be a private CAN. The second ECU 252 may be operably coupled to the brake module 210 via a third communication bus 292 and a fourth communication bus 293. One of the third and fourth communication buses 292 and 293 may be a public CAN, and the other of the third and fourth communication buses 292 and 293 may be a private CAN. Similarly, the third ECU 254 may be operably coupled to the brake module 210 by a fifth communication bus 294 and a sixth communication bus 295. One of the fifth and sixth communication buses 294 and 295 may be a public CAN, and the other of the fifth and sixth communication buses 294 and 295 may be a private CAN. The fourth ECU 256 may be operably coupled to the brake module 210 by a seventh communication bus 296 and an eighth communication bus 297. One of the seventh and eighth communication buses 296 and 297 may be a public CAN, and the other of the seventh and eighth communication buses 296 and 297 may be a private CAN. The public CAN associated with each of the second ECU 252 and the third ECU 254 may be operably coupled to the VCM 136 to receive control instructions therefrom via the third communication bus 292 and the fourth communication bus 293, respectively.

The various network communication buses (i.e., the first, second, third, fourth, fifth, sixth, seventh, and eighth communication buses 290, 291, 292, 293, 294, 295, 296, and 297) may provide redundant instruction paths for the respective ECUs to ensure signaling for braking torque application is providable even if one signal path is lost or inoperable for any reason. With redundant signaling paths, and redundant power supplies, and further with temporary power supplies backing up the redundant power supplies, extremely high levels of redundancy are provided by example embodiments. Thus, for example, if a single or dual loss of power occurs, the respective temporary power supplies may provide power on a temporary basis for sufficient time to slow the vehicle 110 to a stable (e.g., stopped) state. The first, second, third, and fourth WSSs 240, 242, 244 and 246 may provide wheel speed information to respective ECUs to notify the respective ECUs to continue to apply braking signals in the event of a single or dual power loss until wheel speeds are reduced to a stable value (e.g., zero). The wheel speeds may also be communicated to the VCM 136 and/or the brake module 210 such that any control algorithm at either of the VCM 136 or the brake module 210 may also receive wheel speed information to apply control signaling accordingly.

In an example embodiment, a control module (e.g., the brake module 210 and/or VCM 136) may receive a power input from each of the first and second power networks 270 and 274. If either of the power inputs is lost, the brake module 210 may not the power loss and utilize the corresponding temporary power supply to supply backup power for respective ECUs. Thus, for example, if the first power network 270 is lost, the brake module 210 may note the loss and activate the first temporary power supply 280 (e.g., connecting the first temporary power supply 280 to the first power network bus 272) to provide backup power to the second and third ECUs 252 and 254, which may be actuated to slow or stop the vehicle 110. If instead (or additionally) the second power network 174 is lost, the brake module 210 may note the loss and activate the second temporary power supply 282 (e.g., connecting the second temporary power supply 282 to the second power network bus 276) to provide backup power to the first and fourth ECUs 250 and 256, which may be actuated to slow or stop the vehicle 110.

Figure 3:
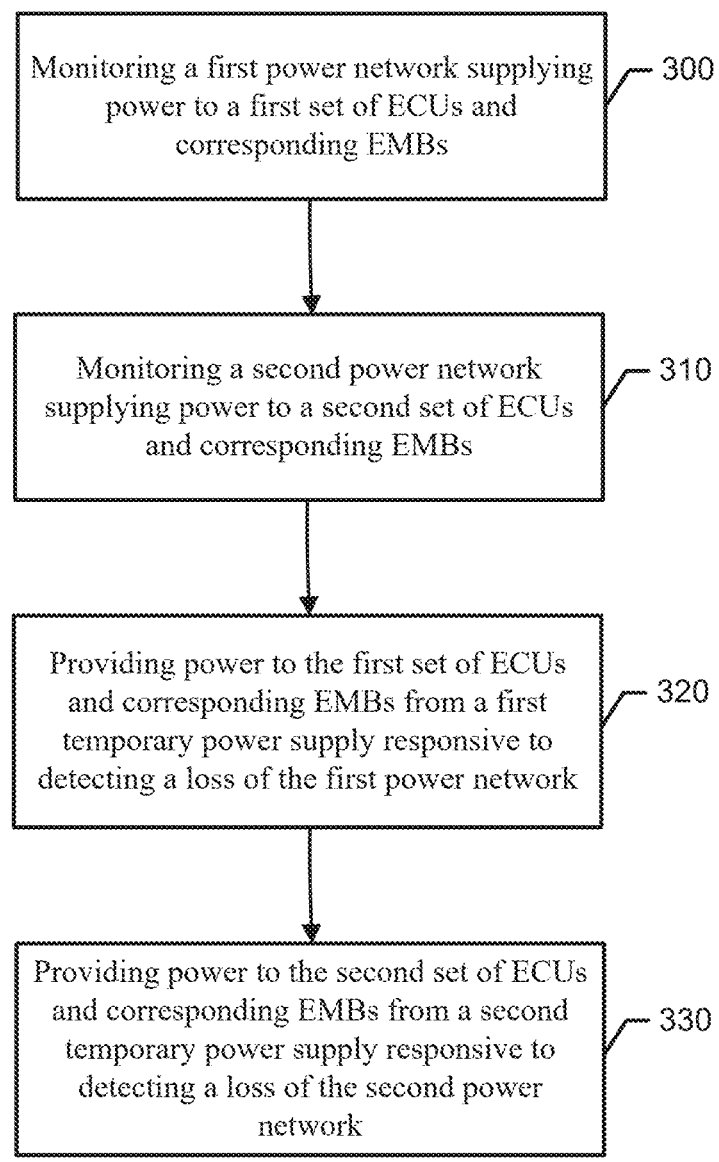
FIG. 3 illustrates a block diagram of a method of providing backup braking power to a four corner, full EMB braking system via a control module in accordance with an example embodiment.

FIG. 3 illustrates a method of providing backup braking power to a four corner, full EMB braking system in accordance with an example embodiment. The method may include monitoring a first power network supplying power to a first set of ECUs and corresponding EMBs at operation 300 and monitoring a second power network supplying power to a second set of ECUs and corresponding EMBs at operation 310. At operation 320, responsive to detecting a loss of the first power network, the method may include providing power to the first set of ECUs and corresponding EMBs from a first temporary power supply. The method may further include providing power to the second set of ECUs and corresponding EMBs from a second temporary power supply responsive to detecting a loss of the second power network at operation 330.

A vehicle braking system for a vehicle may therefore be provided. The vehicle braking system may include a first EMB assembly associated with a first wheel, a second EMB assembly associated with a second wheel, a third EMB assembly associated with a third wheel, a fourth EMB assembly associated with a fourth wheel, a control module (e.g., brake module and/or VCM) to control application of signaling and power for operation of the first, second, third and fourth EMB assemblies where the power is provided from a first power network and a second power network, a first temporary power supply to backup the first power network, and a second temporary power supply to backup the second power network.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the system may further include a communication bus network operably coupling the control module to the first, second, third and fourth EMBs for providing signaling for actuation of the first, second, third and fourth EMBs. In an example embodiment, the communication bus network may include a first communication bus and a second communication bus operably coupling the first EMB assembly to the control module, a third communication bus and a fourth communication bus operably coupling the second EMB assembly to the control module, a fifth communication bus and a sixth communication bus operably coupling the third EMB assembly to the control module, and a seventh communication bus and an eighth communication bus operably coupling the fourth EMB assembly to the control module. In some cases, the first, third, fifth and seventh communication buses may each be instances of a private controller area network (CAN) bus, and second, fourth, sixth and eighth communication buses are each instances of a public CAN bus. In an example embodiment, the first power network is QM power, and the second power network is ASIL B power. In some cases, the first and second temporary power supplies are each ultra-capacitors. In an example embodiment, the first EMB assembly may be actuated by a first motor controlled by a first electronic control unit (ECU), the second EMB assembly may be actuated by a second motor controlled by a second ECU, the third EMB assembly may be actuated by a third motor controlled by a third ECU, and the fourth EMB assembly may be actuated by a fourth motor controlled by a fourth ECU. In some cases, the first power network may be operably coupled to the first ECU and the fourth ECU, and the second power network may be operably coupled to the second ECU and the third ECU. In an example embodiment, the first temporary power supply may be operably coupled to the first ECU and the fourth ECU to provide backup power for operation of the first and fourth EMB assemblies responsive to a loss of the first power network, and the second temporary power supply may be operably coupled to the second ECU and the third ECU to provide backup power for operation of the second and third EMB assemblies responsive to a loss of the second power network. In some cases, a brake pedal of the system may be operably coupled to the control module via a brake pedal position sensor that provides an electronic signal to the control module indicative of a position of the brake pedal. In an example embodiment, the brake pedal position sensor may include a first position sensor and a second position sensor that each independently determine the position of the brake pedal, and each independently provide an instance of the electronic signal to the control module. In some cases, the first position sensor and the second position sensor may employ different sensing technologies. In some examples, a first wheel speed sensor provides a first wheel speed to the first ECU, a second wheel speed sensor provides a second wheel speed to the second ECU, a third wheel speed sensor provides a third wheel speed to the third ECU and a fourth wheel speed sensor provides a fourth wheel speed to the fourth ECU. In response to a loss of the first or second power network, the control module instructs the first, second, third and fourth ECUs to apply braking torque until the first, second, third and fourth wheel speeds are reduced to zero.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle braking system comprising:
a first electro mechanical brake (EMB) assembly associated with a first wheel;
a second EMB assembly associated with a second wheel;
a third EMB assembly associated with a third wheel;
a fourth EMB assembly associated with a fourth wheel;
a control module to control application of signaling and power for operation of the first, second, third and fourth EMB assemblies, the power being provided from a first power network and a second power network;
a first temporary power supply to backup the first power network; and
a second temporary power supply to backup the second power network,
wherein a brake pedal of the system is operably coupled to the control module via a brake pedal position sensor that provides an electronic signal to the control module indicative of a position of the brake pedal,
wherein the brake pedal position sensor comprises a first position sensor and a second position sensor that each independently determine the position of the brake pedal, and each independently provide an instance of the electronic signal to the control module, and
wherein the first position sensor and the second position sensor employ different sensing technologies.

2. The vehicle braking system of claim 1, further comprising a communication bus network operably coupling the control module to the first, second, third and fourth EMBs for providing signaling for actuation of the first, second, third and fourth EMBs.

3. The vehicle braking system of claim 2, wherein the communication bus network comprises:
a first communication bus and a second communication bus operably coupling the first EMB assembly to the control module,
a third communication bus and a fourth communication bus operably coupling the second EMB assembly to the control module,
a fifth communication bus and a sixth communication bus operably coupling the third EMB assembly to the control module, and
a seventh communication bus and an eighth communication bus operably coupling the fourth EMB assembly to the control module.

4. The vehicle braking system of claim 3, wherein the first, third, fifth and seventh communication buses are each instances of a private controller area network (CAN) bus, and second, fourth, sixth and eighth communication buses are each instances of a public CAN bus.

5. The vehicle braking system of claim 1, wherein the first power network is QM power, and the second power network is ASIL B power.

6. The vehicle braking system of claim 5, wherein the first and second temporary power supplies are each ultra-capacitors.

7. The vehicle braking system of claim 1, wherein the first EMB assembly is actuated by a first motor controlled by a first electronic control unit (ECU), the second EMB assembly is actuated by a second motor controlled by a second ECU, the third EMB assembly is actuated by a third motor controlled by a third ECU, and the fourth EMB assembly is actuated by a fourth motor controlled by a fourth ECU.

8. The vehicle braking system of claim 7, wherein the first power network is operably coupled to the first ECU and the fourth ECU, and the second power network is operably coupled to the second ECU and the third ECU.

9. The vehicle braking system of claim 8, wherein the first temporary power supply is operably coupled to the first ECU and the fourth ECU to provide backup power for operation of the first and fourth EMB assemblies responsive to a loss of the first power network, and
wherein the second temporary power supply is operably coupled to the second ECU and the third ECU to provide backup power for operation of the second and third EMB assemblies responsive to a loss of the second power network.

10. The vehicle braking system of claim 8, wherein a first wheel speed sensor provides a first wheel speed to the first ECU, a second wheel speed sensor provides a second wheel speed to the second ECU, a third wheel speed sensor provides a third wheel speed to the third ECU and a fourth wheel speed sensor provides a fourth wheel speed to the fourth ECU, and
wherein in response to a loss of the first or second power network, the control module may instruct the first, second, third and fourth ECUs to apply braking torque until the first, second, third and fourth wheel speeds are reduced to zero.

11. A method of providing backup braking power to a four corner, full EMB braking system via a control module, the method comprising:
monitoring a first power network supplying power to a first set of ECUs and corresponding EMBs;
monitoring a second power network supplying power to a second set of ECUs and corresponding EMBs;
providing power to the first set of ECUs and corresponding EMBs from a first temporary power supply responsive to detecting a loss of the first power network; and
providing power to the second set of ECUs and corresponding EMBs from a second temporary power supply responsive to detecting a loss of the second power network,
wherein the control module singularly controls the application of signaling and power control to both the first set and the second set of ECUs and corresponding EMBs.

12. The method of claim 11, wherein the first set of ECUs comprises a first and fourth ECU associated with a first set of wheels at opposite corners of the vehicle,
wherein the second set of ECUs comprises a second and third ECU associated with a second set of wheels at opposite corners of the vehicle,
wherein the first power network is operably coupled to the first ECU and the fourth ECU, and the second power network is operably coupled to the second ECU and the third ECU.

13. The method of claim 12, wherein the first temporary power supply is operably coupled to the first ECU and the fourth ECU to provide backup power for operation of the first and fourth EMB assemblies responsive to a loss of the first power network, and
wherein the second temporary power supply is operably coupled to the second ECU and the third ECU to provide backup power for operation of the second and third EMB assemblies responsive to a loss of the second power network.

14. The method of claim 11, wherein a brake pedal is operably coupled to the control module via a brake pedal position sensor that provides an electronic signal to the control module indicative of a position of the brake pedal.

15. The method of claim 14, wherein the brake pedal position sensor comprises a first position sensor and a second position sensor that each independently determine the position of the brake pedal, and each independently provide an instance of the electronic signal to the control module, and wherein the first position sensor and the second position sensor employ different sensing technologies.

16. The method of claim 11, wherein the first power network is QM power, and the second power network is ASIL B power.

17. The method of claim 16, wherein the first and second temporary power supplies are each ultra-capacitors.

* * * * *